United States Patent [19]
Beranek et al.

[11] Patent Number: 5,896,481
[45] Date of Patent: Apr. 20, 1999

[54] OPTICAL SUBASSEMBLY WITH A GROOVE FOR ALIGNING AN OPTICAL DEVICE WITH AN OPTICAL FIBER

[75] Inventors: Mark William Beranek; Harold Edward Hager, both of Bellevue; Eric Yuen-Jun Chan, Mercer Island, all of Wash.

[73] Assignee: The Boeing Company, Seattle, Wash.

[21] Appl. No.: 08/866,891

[22] Filed: May 30, 1997

[51] Int. Cl.$^6$ ................................................ G02B 6/42
[52] U.S. Cl. ........................................ 385/90; 385/91
[58] Field of Search ................................. 385/88–91

[56] References Cited

U.S. PATENT DOCUMENTS

| | | |
|---|---|---|
| 4,181,400 | 1/1980 | Malsot et al. . |
| 4,725,114 | 2/1988 | Murphy . |
| 4,730,198 | 3/1988 | Brown et al. . |
| 4,756,591 | 7/1988 | Fischer et al. ............ 385/88 |
| 4,802,727 | 2/1989 | Stanley ..................... 385/89 |
| 4,810,557 | 3/1989 | Blonder et al. . |
| 4,816,182 | 3/1989 | Novich et al. . |
| 4,882,304 | 11/1989 | Novich et al. . |
| 4,887,882 | 12/1989 | Mousseaux et al. . |
| 4,888,081 | 12/1989 | Althaus et al. . |
| 4,904,411 | 2/1990 | Novich et al. . |
| 5,047,181 | 9/1991 | Occhionero et al. . |
| 5,047,182 | 9/1991 | Sundback et al. . |
| 5,071,213 | 12/1991 | Chan . |
| 5,179,609 | 1/1993 | Blonder et al. ............ 385/89 |
| 5,257,336 | 10/1993 | Dautartas . |
| 5,259,054 | 11/1993 | Benzoni et al. . |
| 5,291,572 | 3/1994 | Blonder et al. ............ 385/88 |
| 5,337,398 | 8/1994 | Benzoni et al. . |
| 5,351,331 | 9/1994 | Chun et al. . |
| 5,377,289 | 12/1994 | Johnson et al. . |
| 5,388,174 | 2/1995 | Roll et al. . |
| 5,415,730 | 5/1995 | Canning et al. . |
| 5,432,878 | 7/1995 | Smous . |
| 5,684,902 | 11/1997 | Tada .......................... 385/88 |

*Primary Examiner*—John D. Lee
*Attorney, Agent, or Firm*—Christensen O'Connor Johnson & Kindness PLLC

[57] ABSTRACT

An optical subassembly comprises a micro-optical bench and a corresponding molded device submount having an optical detector, LED, or laser diode mounted thereon. The optical bench is a semiconductor wafer having one or more grooves etched therein. A submount groove is designed to receive a cooperating ridge on a bottom surface of the molded device submount so as to limit the movement of the submount on the optical bench. An optical fiber is secured in an alignment groove and secured to the optical bench. To complete the subassembly, it is only necessary to set the axial distance between the optical detector, LED, or laser diode and a distal end of the optical fiber. A fiber stop incorporated into the micro-optical bench automatically adjusts the axial positioning of the distal end of the fiber to the optical detector, LED, or laser diode. In addition, a hermetically sealed package is provided with a faceplate that is secured to the package. The faceplate is easily adapted to include various latching mechanisms that cooperate with a variety of different optical connectors.

13 Claims, 4 Drawing Sheets

OPTICAL SUBASSEMBLY WITH A GROOVE FOR ALIGNING AN OPTICAL DEVICE WITH AN OPTICAL FIBER

GOVERNMENT LICENSE RIGHTS

The U.S. Government has a paid-up license in this invention and the right in limited circumstances to require the patent owner to license others on reasonable terms as provided by the terms of Wright Lab F33615-94-C-1483 awarded by DARPA.

FIELD OF THE INVENTION

The present invention relates to the alignment of an optical fiber in a fiber-optic transmitter/receiver subassembly.

BACKGROUND OF THE INVENTION

The manufacture of optoelectronic modules, such as optoelectronic receivers and optoelectronic transmitters, requires that an optical fiber be properly aligned and fixed in an optical subassembly. In an optical receiver, a fiber is aligned with an optical detector, usually a PIN photodiode. In an optical transmitter, an optical fiber is aligned with a light-emitting diode (LED) or a laser diode. A goal of optical alignment is to maximize the amount of light coupling between the optical detector, LED, or laser diode and the optical fiber. The alignment of the fiber member with the LED, laser diode, or optical detector is a critical step in the manufacture of an optoelectronic subassembly.

In the past, the step of aligning an optical fiber had to be done actively. Typically, the process involves fixing the position of either the optical detector, LED, or laser diode or the optical fiber, and positioning the freely moving fiber or optical detector, LED, or laser diode while simultaneously measuring the amount of light coupled between the two so that a maximum amount of light is passed. Once the optimum position is found, the position of the optical fiber or optical detector, LED, or laser diode is fixed. While this process generally works well, it is both labor-intensive and costly.

Optical subassemblies are often used in harsh environments where they are subjected to wide variations in temperature, pressure, and g-forces. To withstand such environments, such subassemblies are often mounted in hermetically sealed packages. Each package is adapted to mate with a connector that contains an optical fiber. Typically, the connectors made by each manufacturer require a different type of latching mechanism to be mounted to the package. In addition to the problem of aligning the optical fiber with the optical detector, LED, or laser diode, it has also been difficult to produce a subassembly package that can be easily adapted to mate with a variety of optical connectors made by different manufacturers.

Given the shortcoming in the prior art, there is a need for a method of producing optical subassemblies in a cost-effective manner that does not require active alignment of an optical fiber with an optical detector, LED, or laser diode. In addition, there is a need for a subassembly package that is easily adapted to mate with a variety of connector types.

SUMMARY OF THE INVENTION

The present invention comprises an optical subassembly including an optical bench and molded device submount. The optical bench is a wafer of semiconductor material having a plurality of grooves etched in a top surface thereof. The grooves include a submount groove that is adapted to receive a ridge or nodule formed on a bottom surface of a molded device submount. Mounted on the submount is an optical detector, LED, or laser diode. When placed on the optical bench, the ridge or nodule of the device submount fits within the submount groove in order to transversely align the optical detector, LED, or laser diode with an end of an optical fiber. Alternatively, the optical detector, LED, or laser diode may be directly bonded within a groove disposed on a top surface of the optical bench. The optical fiber may be aligned and secured to the optical bench in a variety of ways. For example, a solder groove can be etched into the bench and the fiber then soldered in the solder groove to secure the fiber to the bench. Alternatively, the optical fiber can be soldered to a step that is cut or etched into the top surface of the optical bench. Finally, a ferrule can be placed over the optical fiber and can be adhesively secured in a groove disposed on the top surface of the optical bench.

The invention also comprises a subassembly package that can be adapted to mate with a plurality of different connector styles. The package includes a faceplate that is secured to a front face of the package. The faceplate provides a flat, relatively stiff surface on which a variety of latching mechanisms can be easily mounted in order to allow the package to mate with different connector types.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a passively aligned optical subassembly for use in a fiber-optic communication system.

Figure 1:
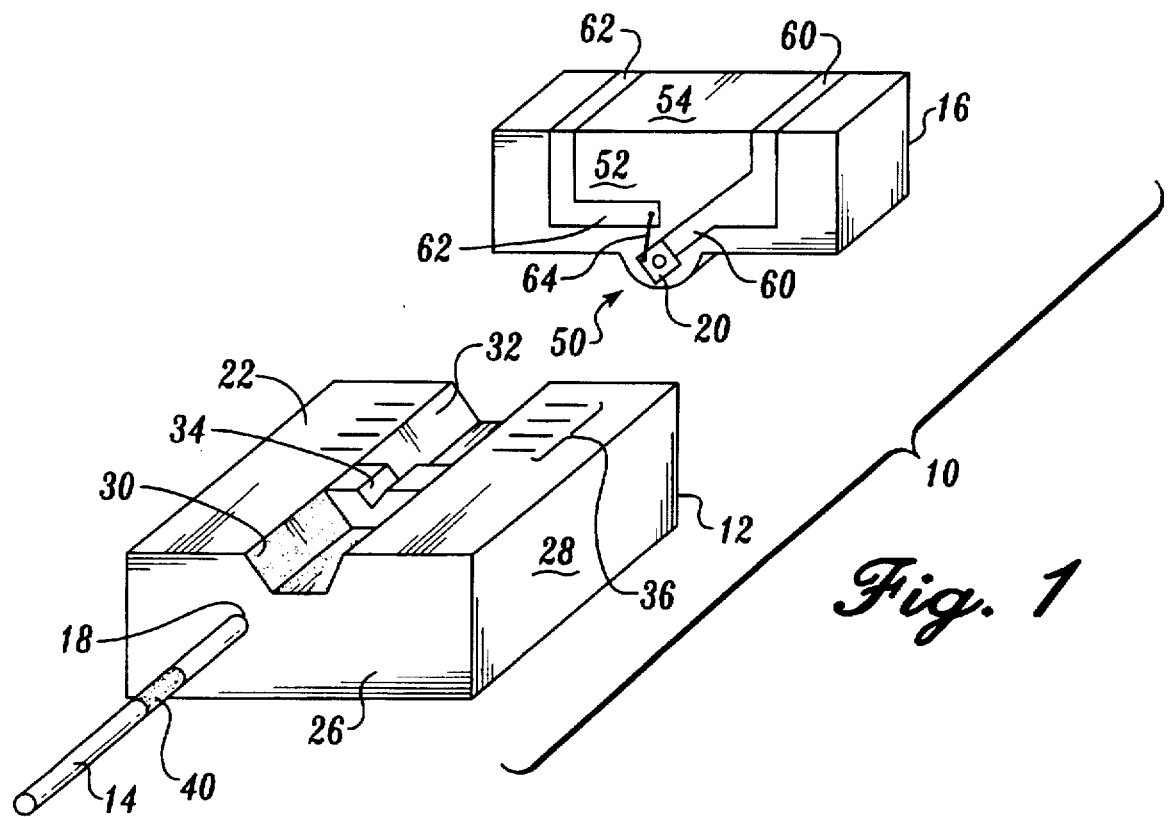
FIG. 1 is an isometric view of a micro-optical bench and molded device submount that comprise the subassembly according to the present invention.

FIG. 1 illustrates an optical subassembly according to the present invention. The subassembly 10 generally comprises a micro-optical bench 12, an optical fiber 14 and a molded device submount 16. The purpose of the subassembly is to secure a distal end 18 of the optical fiber 14 so that the distal end is positioned in front of an optical detector, LED, or laser diode 20 in a manner that maximizes the amount of light coupled between the optical fiber and the optical detector, LED, or laser diode.

The micro-optical bench 12 generally comprises a small wafer of semiconductor material such as silicon. In the presently preferred embodiment of the invention, the optical bench has a length and width of 4 mm and a height of approximately 1 mm. On a top surface 22 of the micro-optical bench are three V-shaped grooves that are etched along a center line that extends between a front face 26 and a rear face 28 of the micro-optical bench 12. A soldering groove 30 extends from the front face 26. A submount groove 32 extends from the rear face 28 towards the front face 26. Connecting the soldering groove 30 and the submount groove 32 is a shallow fiber alignment groove 34.

In the presently preferred embodiment of the invention, the soldering groove 30 has a maximum width of approximately 0.6 mm and has a length of approximately 1 mm. The submount groove 32 has a maximum width of approximately 1 mm and a length of approximately 2.3 mm. Finally, the fiber alignment groove 34 has a width of approximately 0.3 mm and a length of 0.65 mm. Each of the grooves 30, 32, and 34 may be either V-shaped or a truncated V shape, depending on when the etching process of the optical bench is halted. To reduce failure as a result of the stresses in the solder that occur at the point of the V-shaped groove with large variations in temperature, it is believed that a truncated soldering V-groove 30 is superior to the V-shaped soldering groove.

Etched onto the top surface 22 of the micro-optical bench along either side of the submount groove 32 are a plurality of vernier fiducials or accurately spaced markings 36 that allow a user to measure the distance between an optical detector, LED, or laser diode that is secured to the molded device submount 16 and the distal end 18 of the optical fiber 14.

The walls and floor of the soldering groove 30 are preferably metalized so that melted solder adheres to the soldering groove. To align and secure the optical fiber 14 to the optical bench 12, the outer cladding 40 near the distal end of the optical fiber is also metalized. The distal end 18 of the fiber is laid in the fiber alignment groove 34 so that the metalized portion of the outer cladding 40 is positioned over the soldering groove 30. The optical bench 12 and a solder preform are heated so that the solder preform melts and secures the fiber in the soldering groove 30.

The molded device submount 16 comprises a generally rectangular piece of ceramic material. The submount preferably has the same width, approximately 4 mm, as the optical bench 12 and a length of approximately 2 mm.

Disposed on a bottom surface of the submount 16 is an outwardly extending ridge or nodule 50. In the presently preferred embodiment of the invention, the ridge 50 has a semi-circular cross section and extends from a front face 52 of the submount to a rear face 54 of the submount. The radius of the ridge 50 is sized such that it fits in the corresponding submount groove 32 that is disposed on the top surface of optical bench 12. The ridge 50 operates to align the submount on the optical bench 12 so that the optical detector, LED, or laser diode 20 can be accurately positioned near the distal end 18 of the optical fiber 14.

The device submount 16 is preferably made of aluminum nitride if the optical detector, LED, or laser diode 20 generates heat and thermal conductivity is a consideration. If heat transfer is not a consideration, then the submount 16 is preferably made of aluminum oxide. To accurately control the radius of the ridge 50, an individual submount 16 is cut from a bar that is made according to the Quickset™ process developed by Ceramics Process Systems. The Quickset™ process is described in U.S. Pat. Nos. 4,816,182, 4,882,304, 4,904,411, 5,047,181, and 5,047,182.

Disposed on the top surface and the front face 52 of the submount 16 are a pair of traces 60, 62 that carry current to and from the optical detector, LED, or laser diode 20. The optical detector, LED, or laser diode 20 is directly bonded to the trace 60, while a short bond wire 64 carries current from the optical detector, LED, or laser diode 20 to the second trace 62.

To secure the submount 16 to the optical bench 12, a layer of adhesive, such as epoxy, is placed on the bottom surface of the submount 16. The ridge of the submount 16 is then placed in the submount groove 32 and aligned so that the optical detector, LED, or laser diode 20 is optimally positioned with respect to the distal end 18 of the optical fiber 14. Because the optical fiber is held in the alignment groove 34 and the device submount is held in the submount groove, the optical detector, LED, or laser diode 20 is transversely aligned with the distal end 18 of the optical fiber. To complete the alignment, it is only necessary to optimize the axial distance between the optical detector, LED, or laser diode and the distal end of the optical fiber. The axial alignment process is preferably done under a microscope or other magnification device using the vernier fiducials 36 described above. Once the submount is positioned in the submount groove, the epoxy is cured and the optical subassembly 10 is ready for incorporation into a hermetically sealed package. Alternatively, one may secure the submount to the optical bench before axially aligning and soldering the optical fiber to the optical bench.

Figure 2A:
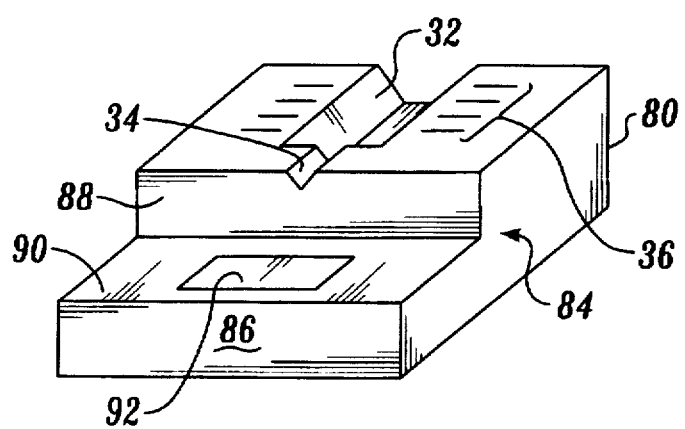
FIGS. 2A–2C are isometric views of alternative embodiments of the micro-optical bench according to the present invention.
Figure 2B:
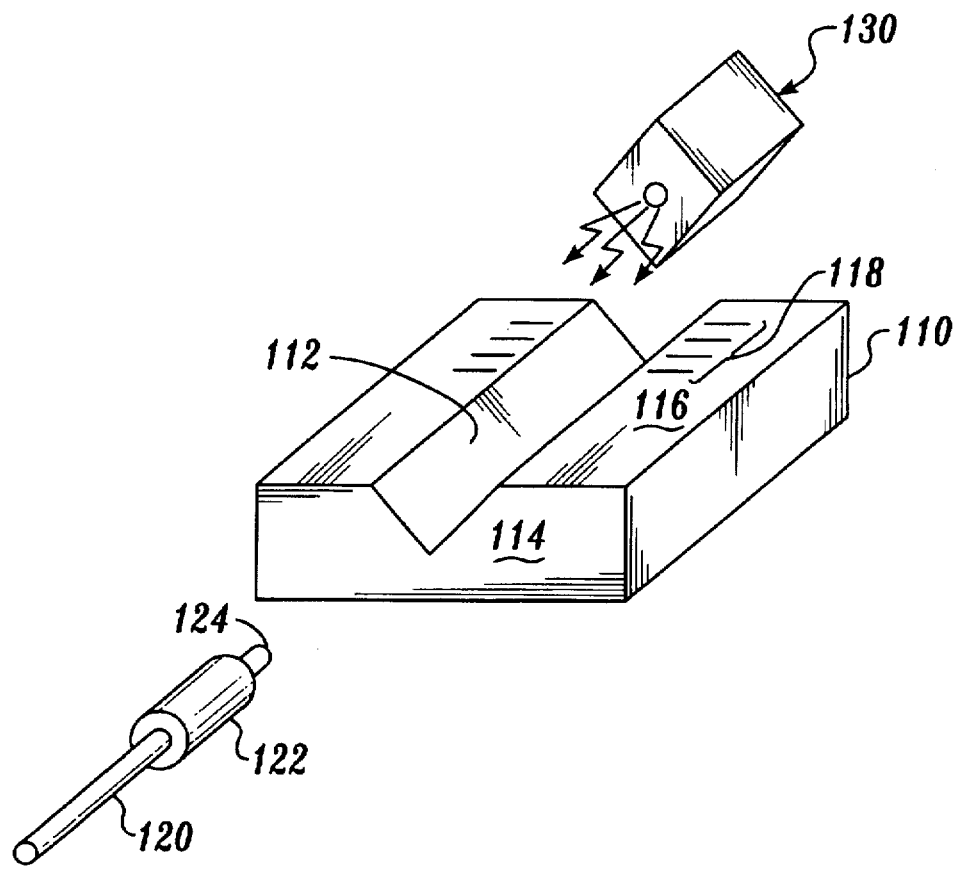
Figure 2C:
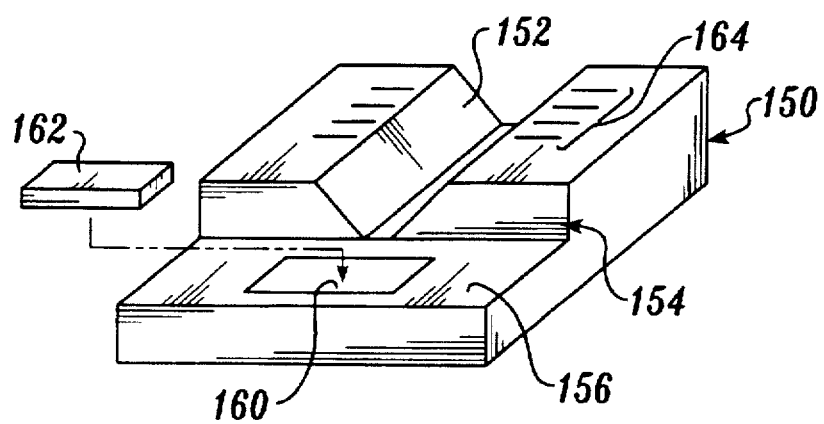

FIGS. 2A–2C show alternative embodiments of the micro-optical bench. An optical bench 80, shown in FIG. 2A, is a silicon wafer having a submount groove 32 vernier fiducials 36 and a fiber alignment groove 34 similar to those found on the optical bench 12 shown in FIG. 1. Instead of the soldering groove 30, the optical bench 80 includes a step 84 that is cut or etched into a front face 86 of the bench. The step 84 is generally defined by a riser 88 and a tread surface 90 that meets the riser 88. Disposed on the tread surface 90 is a soldering pad 92 that is centered underneath the fiber alignment groove 34.

To secure the optical fiber on the optical bench 80, a solder preform is positioned on the solder pad 92 and a metalized portion of optical fiber is placed over the solder preform. The optical bench 80 and solder preform are then heated, thereby melting the solder onto the optical pad and surrounding the optical fiber. Because the solder only wets the area covered by the solder pad 92, the position of the optical fiber solder joint can be closely controlled. As with the previous embodiment shown in FIG. 1, an optical submount fits within the submount groove 32 to align the optical detector, LED, or laser diode with a distal end of an optical fiber.

FIG. 2B shows another alternative embodiment of the micro-optical bench. The optical bench 110 comprises a silicon wafer. Disposed on a top surface of the bench is a central groove 112 of substantially constant width and depth that extends from a front face 114 to a rear face 116 of the bench. A set of vernier fiducials 118 is etched on either side of the central groove 112. To secure an optical fiber in the central groove 112, an optical fiber 120 is fitted through a cylindrical ferrule 122. The ferrule 122 can be secured within the central groove 112 using an adhesive, such as epoxy. A distal end 124 of the optical fiber protrudes through the end of the ferrule. Provided that no more than approximately 0.050 inch of optical fiber extends through the ferrule, the ferrule will hold the distal end of the fiber in the proper position with respect to an optical detector, LED, or laser diode. A molded device submount 16 as shown in FIG. 1 can be positioned in the central groove 112 to align an optical detector, LED, or laser diode with the optical fiber.

As an alternative to mounting the laser diode on a molded device submount, a vertical cavity surface emitting laser (VCSEL) chip 130 is shaped to fit the contours of the central groove 112. The VCSEL chip 130 can be secured in the groove 112 with an epoxy or similar adhesive. The diameter of the cylindrical ferrule 122 is selected such that the distal end 124 of the optical fiber aligns with the light emitting source of the VCSEL 130. Therefore, to construct the optical subassembly, it is only necessary to secure the ferrule 122 in the central groove 112 and to axially align the VCSEL chip 130 using the vernier fiducials 118 under a microscope before the adhesive is set. Alternatively, the VCSEL chip may be bonded first, followed by the ferrule axial alignment and bonding.

FIG. 2C shows yet another alternative embodiment of the micro-optical bench. The micro-optical bench 150 comprises a wafer of semiconductor material having a central groove 152 etched on the top surface of the bench. A step defined by a riser 154 and a tread surface 156 is formed into the front face of the optical bench. Preferably, the depth of the step is equal to the depth of the central groove 152. A solder pad 160 is placed on the tread surface 156 in front of the central groove 152.

The optical fiber 120 including a cylindrical ferrule 122 is positioned in the central groove 152. However, in this embodiment, a portion of the optical fiber behind the ferrule is metalized and is secured to the solder pad 160 using a solder preform 162 that, when melted, secures the fiber to the solder pad 160. The optical bench 150 can be used with either the VCSEL chip 130 shown in FIG. 2B or can accept the molded device submount 16 shown in FIG. 1. A set of vernier fiducials 164 are etched in the upper surface of the optical bench 150 at a position on either side of the central groove 152. To align the optical detector, LED, or laser diode with a distal end 124 of the optical fiber, it is only necessary to closely measure the distance between the distal end of the fiber and the optical detector, LED, or laser diode using the vernier fiducials.

Figure 3A:
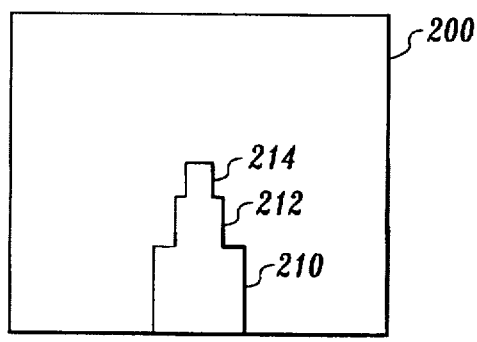
FIGS. 3A–3D illustrate an optical bench including a fiber stop for use with a "flip chip" optical detector, LED, or laser diode according to another aspect of the present invention.

In some instances, it is necessary to use the optical bench with a so-called "flip chip" that has the active optical detector, LED, or laser diode element oriented in a direction that is normal to the top surface of the optical bench. FIG. 3A is a top plan view of a micro-optical bench 200 that is designed to be used with such a flip chip device. The bench 200 again comprises a wafer of semiconductor material having a series of grooves etched in its top surface. A solder groove 210 comprises a metalized truncated V-shaped groove that is sized to receive a metalized optical fiber in order to solder the fiber to the optical bench 200. At an end of the solder groove 210 is a narrower cladding groove 212 that is sized to receive the optical fiber, including the fiber's outer cladding layer. At the distal end of the cladding groove 212 is a still narrower core groove 214.

Figure 3B:
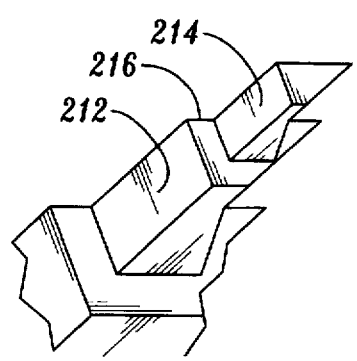
Figure 3B:
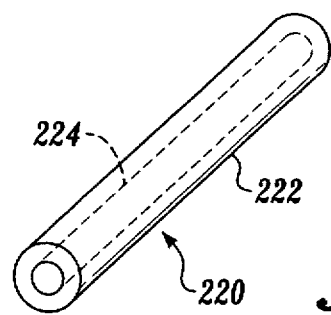

FIG. 3B shows in greater detail the cladding groove 212 and the core groove 214. As can be seen, the core groove 214 has a width that is narrower than the cladding groove 212. The difference in widths and depths therefore creates a fiber stop 216 at the distal end of the cladding groove 212. A fiber 220 comprises a cladding material 222 and an inner core 224. The distal end of the cladding material that surrounds the core will engage the fiber stop 216 to prevent the fiber from being further inserted into the cladding groove 212. The distal end of the core groove 214 is angled and mirrored so that light from the core 224 is turned upward and delivered to the active element of the flip chipped device 240.

Figure 3C:
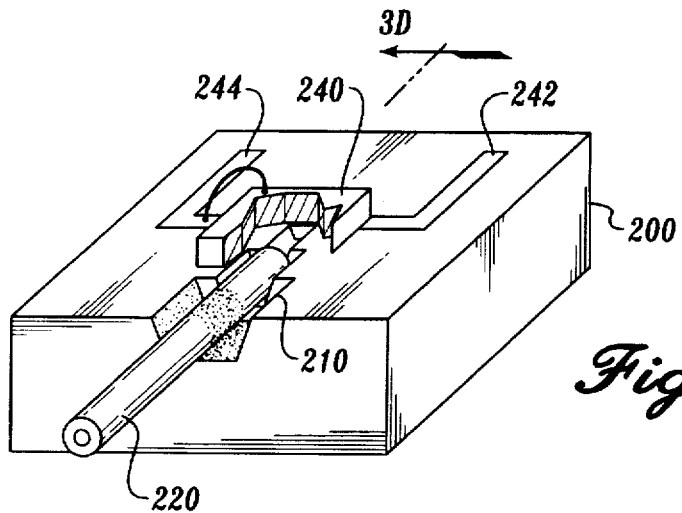

FIG. 3C shows the optical bench 200 with the fiber 220 installed. The optical fiber 220 is secured in the solder groove 210 by heating the bench, and a solder preform until the preform melts and surrounds the fiber. A flip chip 240 is positioned over the core groove 214 to transmit and receive light from the core. A pair of traces 242, 244 are deposited on a top surface of the optical bench 200 to deliver current to and carry current from the flip chip device 240.

Figure 3D:
Figure 3D:
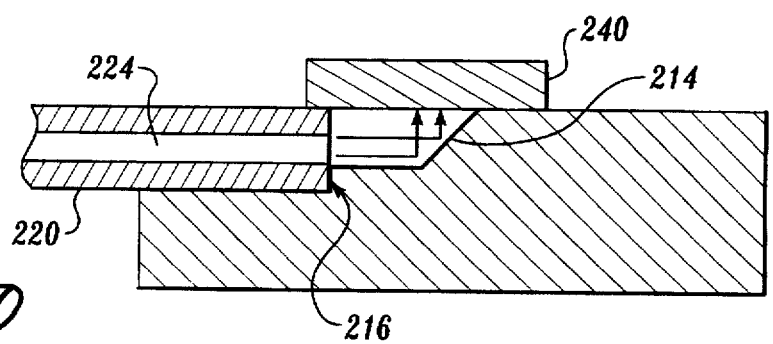

FIG. 3D is a cross-sectional view of the optical bench 200. As indicated above, the distance that the optical fiber is able to be inserted into the optical bench is controlled by the fiber stop 216 that abuts the distal end of the cladding material of the optical fiber 220. Light emitting from the fiber is reflected off the mirrored surface at the distal end of the core groove 214 where it is reflected upward as shown in FIG. 3D. If device 240 is an emitting device, light emitting from the flip-chipped LED or laser diode 240 will reflect off of the mirrored surface into the distal end of the fiber. The length of groove 214 is designed to maximize the coupling of light from fiber 222 to device 240 and vice versa for light emitting device.

As will be appreciated, the optical subassembly of the present invention allows for the easy alignment because the optical fiber and the optical detector, LED, or laser diode are aligned by the grooves on the optical bench. Because these grooves transversely align the fiber and optical detector, LED, or laser diode, it is only necessary to adjust the axial distance between the end of the optical fiber and the optical detector, LED, or laser diode to complete the optical subassembly. A fiber stop incorporated in the optical subassembly eliminates the need to adjust the axial position of the optical fiber.

Before an optical subassembly can be used in its intended environment, it must be hermetically sealed in a package. The packaging prevents moisture and dirt particles from contaminating the optical subassembly during its use. As indicated above, the problem with prior art subassembly packaging is that it is difficult to manufacture a package that is easily adapted to mate with a variety of fiber-optic connectors that are produced by different manufacturers. Therefore, in the past, it had been necessary to individually design each subassembly package for a particular type of connector. This process was labor-intensive and costly.

To reduce the need for having to fit each individual optical subassembly package to a particular type of connector, the present invention also comprises a subassembly package that is more easily adapted to a variety of optical connector styles.

Figure 4A:
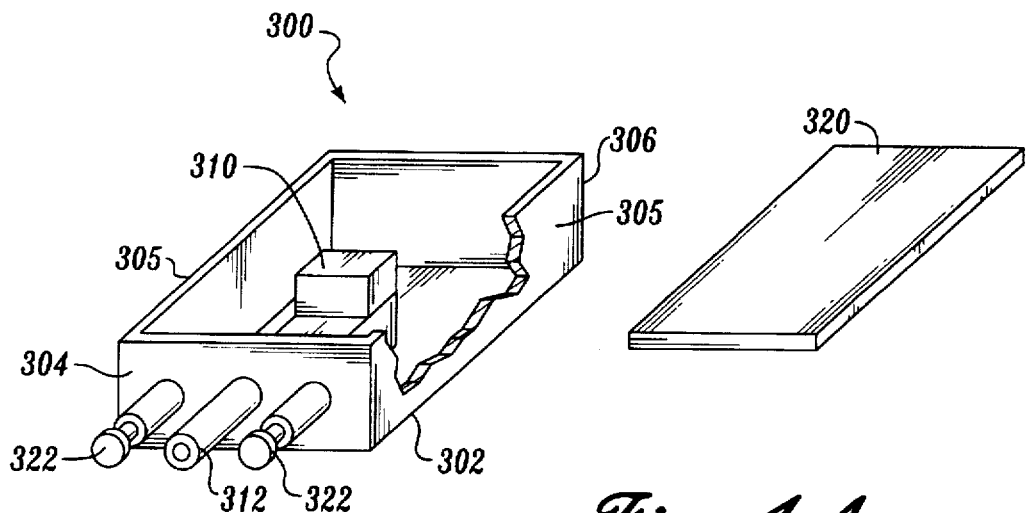
FIGS. 4A–4D illustrate a hermetic package that is adaptable to mate with a variety of connector styles according to another aspect of the present invention.

FIG. 4A illustrates a prior art optical subassembly package 300. The package generally comprises a flat metal bed 302 with a front face 304, rear face 306, and a pair of sidewalls 305 that are bent at 90° to the plane of the bed. A printed circuit board 310, including the optical subassembly, is mounted on the bed 302. Either an optical fiber is routed through an alignment ferrule, or a lens assembly 312 is mounted onto the front face 304 of the package. A cover 320 is secured over the bed 302 and is hermetically sealed to complete the optical subassembly package.

Most connectors that mate with the optical package 300 require some sort of latching or connecting mechanism 322 to be secured to the front face 304 of the optical package. Typically the latching mechanisms 322 are mounted on either side of the alignment ferrule or lens assembly 312. Because each manufacturer's specifications differ, it was previously necessary to retool the package in order to install the latching mechanisms for each connector type. In addition, because the front face of the package is relatively non-flat, small and thin, it was difficult to get the latching mechanisms to align properly with the alignment ferrule, lens assembly, and connector.

Figure 4B:
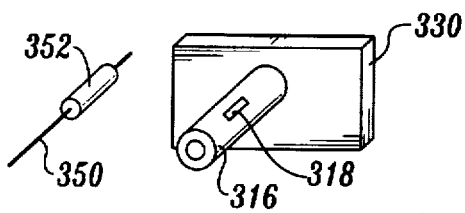

To eliminate the need to individually tool the package for a particular type of connector, the present invention utilizes a faceplate that is secured to the front face 304 of the package. As shown in FIG. 4B, the faceplate 330 comprises a flat, rectangular metal plate that is braised to the front face 304 of the package. In the center of the faceplate 330 is a hole in which a ferrule tube 316 is braised. The ferrule tube is hollow and contains a slot 318 that is used for securing the fiber in the ferrule tube, as will be described below. Because the faceplate 330 is flat and relatively thick, compared to the flatness and thickness of the front face 304 of the package, it is relatively easy to install an appropriate latching mechanisms on either side of the ferrule tube 316 that will mate with a variety of different connector types. Therefore, to produce optical packages for a variety of different connector types, it is only necessary to change the configuration of the particular faceplate that is mounted to the front face of the package.

To secure an optical fiber 350 within the ferrule tube 316, a cylindrical ferrule 352 is inserted into the ferrule tube 316. Preferably, the outer diameter of the ferrule 352 is slightly greater than the inner diameter of the ferrule tube 316. The optical fiber 350 is inserted into the ferrule 352 from the inside of the package 300. The fiber is hermetically sealed in the package with solder. An epoxy or other adhesive can then be used to secure the fiber in the ferrule tube 316 by delivering the epoxy through the slot 318 that is cut in the side of the ferrule tube 316. Once the epoxy is set, the fiber and any portion of the ferrule that extends from the end of the ferrule tube can be cut and polished, if desired.

Figure 4C:
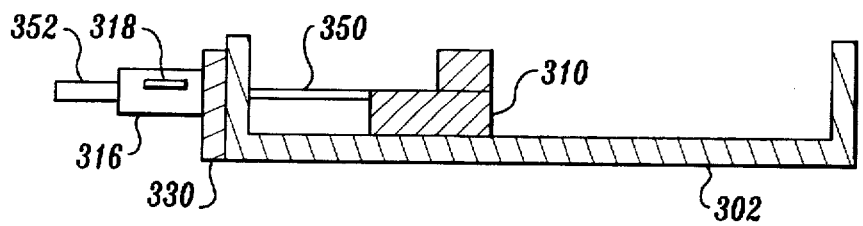

FIG. 4C is a side, cross-sectional view of the hermetic package including the faceplate 330 according to the present invention. In this embodiment, the end of the fiber is cut and the portion of the optical fiber and ferrule protruding from the distal end of the ferrule tube 316 is polished to mate with an appropriate connector.

Figure 4D:
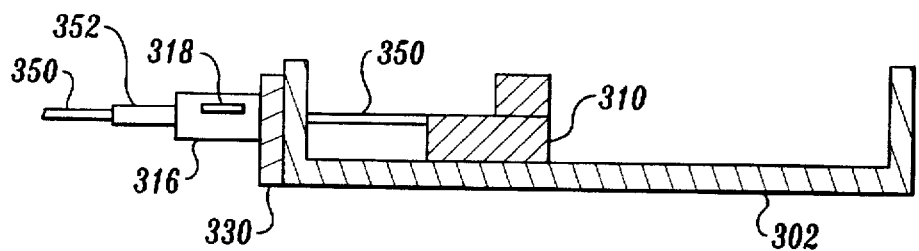

In some instances, it is desirable to leave a length of optical fiber extending from the hermetic package in order to either launch light into the package or to monitor the light output from the package during assembly of the optoelectronic circuit inside the package. As shown in FIG. 4D, a length of optic fiber 350 extends from the distal end of the ferrule 352 for subsequent connection to a length of fiber-optic cable.

By using the faceplate 330, it is easy to install the latching mechanisms that will mate with a variety of connector types without having to individually machine each optical package.

While the preferred embodiment of the invention has been illustrated and described, it will be appreciated that various changes can be made therein without departing from the spirit and scope of the invention. For example, an optical bench may include more than one optical detector, LED, or laser diode mounted in any of the ways specified above. Therefore, the scope of the invention is to be determined solely from the following claims and equivalents thereto.

The embodiments of the invention in which an exclusive property or privilege is claimed are defined as follows:

1. An optical subassembly for aligning a distal end of an optical fiber with an optical detector, LED, or laser diode, comprising:

an optical bench having a submount groove disposed on a top surface thereof and means for securing the optical fiber to the optical bench, a submount having an optical detector, LED, or laser diode mounted thereon, the submount cooperating with the submount groove to transversely align the optical detector, LED, or laser diode with the distal end of the optical fiber; and a ridge disposed on a bottom surface of the submount, the ridge fitting within the submount groove on the optical bench.

2. An optical subassembly for aligning a distal end of an optical fiber with an optical detector, LED, or laser diode, comprising:

an optical bench having a submount groove disposed on a top surface thereof;

a submount having an optical detector, LED, or laser diode mounted thereon, the submount cooperating with the submount groove to transversely align the optical detector, LED, or laser diode with the distal end of the optical fiber; and a truncated metalized soldering groove disposed on the top surface of the optical bench into which a portion of the optical fiber is secured.

3. The optical subassembly of claim 2, further comprising an alignment groove in which the optical fiber is seated, wherein the alignment groove is smaller in width than the submount groove.

4. An optical subassembly for aligning a distal end of an optical fiber with an optical detector, LED, or laser diode, comprising:

an optical bench having a submount groove disposed on a top surface thereof;

a submount having an optical detector, LED, or laser diode mounted thereon, the submount cooperating with the submount groove to transversely align the optical detector, LED, or laser diode with the distal end of the optical fiber; and a step that is etched into the top surface of the optical bench, the step including a solder pad to which a portion of the optical fiber is secured.

5. An optical bench for aligning a distal end of an optical fiber with an optical detector, LED, or laser diode, comprising:

a semiconductor wafer having a plurality of channels etched into a top surface thereof the channels including a first channel having a width and depth selected to receive a cladding and core of the optical fiber and a second channel having a width that is narrower than the width of the first channel, the first and second channels being aligned such that a fiber stop is created at a point where the first and second channels meet, the fiber stop engaging the cladding of the optical fiber to control the axial position at which the fiber is positioned in the channels, wherein an end of the second channel is mirrored to change the direction of light upward the optical fiber.

6. A hermetically sealed optical subassembly housing a bed having a front face, a rear face, and sidewalls wherein the bed is adapted to secure an optical subassembly, comprising:

a faceplate secured to the front face of the bed, the faceplate having one or more hollow ferrule tubes secured thereto, said ferrule tubes each having an optical fiber disposed therein; and a cover that fits over the bed.

7. The hermetically sealed subassembly housing of claim 6, further comprising:

a ferrule that fits over each optical fiber and in each ferrule tube in order to secure the optical fiber in the ferrule.

8. The hermetically sealed optical subassembly housing of claim 6, wherein the fiber is hermetically sealed in the ferrule tube with solder and secured in the ferrule tube with an adhesive.

9. The hermetically sealed optical subassembly housing of claim 6, wherein the faceplate includes a latching mechanism that mates with a corresponding optical connector.

10. An optical subassembly for aligning a distal end of an optical fiber with a vertical cavity surface emitting laser (VCSEL) chip, comprising:

an optical bench having a singular uniform groove disposed on a top surface thereof;

a VCSEL chip mounted in the groove;

an optical fiber mounted in the groove;

a ferrule around the optical fiber; and a step that is etched into the top surface of the optical bench, the step including a solder pad to which the optical fiber is secured.

11. An optical subassembly for aligning a distal end of an optical fiber with an optical detector, LED, or laser diode, comprising:

an optical bench having a submount groove disposed on a top surface thereof and a step that is etched into the top surface of the optical bench, the step including a solder pad to which a portion of the optical fiber is secured such that the distal end of the optical fiber is aligned with the submount groove; and a submount having an optical detector, LED, or laser diode mounted thereon, the submount cooperating with the submount groove to transversely align the optical detector, LED, or laser diode with the distal end of the optical fiber.

12. The optical subassembly of claim 11, wherein the submount further comprises a ridge disposed on a bottom surface of the submount, the ridge fitting within the submount groove on the optical bench.

13. An optical subassembly for aligning a distal end of an optical fiber with an optical detector, LED, or laser diode, comprising:

an optical bench having a groove disposed on a top surface thereof and a step that is etched into the top surface of the optical bench, the step including a solder pad to which a portion of the optical fiber is secured such that the distal end of the optical fiber is aligned with the groove; and an optical detector, LED, or laser diode mounted in the groove.

* * * * *